(12) United States Patent
Ohsawa et al.

(10) Patent No.: US 11,011,753 B2
(45) Date of Patent: May 18, 2021

(54) LITHIUM-ION SECONDARY BATTERY AND METHOD OF PRODUCING THE SAME

(71) Applicant: TOYOTA JIDOSHA KABUSHIKI KAISHA, Toyota (JP)

(72) Inventors: Ryosuke Ohsawa, Okazaki (JP); Keisuke Ohara, Osaka (JP); Akihiro Taniguchi, Ashiya (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 16/281,779

(22) Filed: Feb. 21, 2019

(65) Prior Publication Data
US 2019/0260030 A1    Aug. 22, 2019

(30) Foreign Application Priority Data

Feb. 22, 2018   (JP) .............................. JP2018-029759

(51) Int. Cl.
| | |
|---|---|
| *H01M 4/62* | (2006.01) |
| *H01M 4/04* | (2006.01) |
| *H01M 4/133* | (2010.01) |
| *H01M 4/1393* | (2010.01) |
| *H01M 4/36* | (2006.01) |
| *H01M 4/587* | (2010.01) |
| *H01M 10/0525* | (2010.01) |
| *H01M 10/058* | (2010.01) |
| *H01M 4/48* | (2010.01) |
| *H01M 4/02* | (2006.01) |

(52) U.S. Cl.
CPC ......... *H01M 4/622* (2013.01); *H01M 4/0404* (2013.01); *H01M 4/133* (2013.01); *H01M 4/1393* (2013.01); *H01M 4/364* (2013.01); *H01M 4/48* (2013.01); *H01M 4/587* (2013.01); *H01M 10/058* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2013/0323605 A1* 12/2013 Yamamoto .............. H01M 4/36
                                                                429/332

FOREIGN PATENT DOCUMENTS

| JP | 2005-108456 A |   | 4/2005 |
| JP | 2005108456 A | * | 4/2005 |

(Continued)

OTHER PUBLICATIONS

Machine translation of JP 2015-088462 A (Year: 2015).*

*Primary Examiner* — Robert S Carrico
(74) *Attorney, Agent, or Firm* — Sughrue Mion, PLLC

(57) ABSTRACT

A lithium-ion secondary battery includes at least a negative electrode, a positive electrode, and an electrolyte. The negative electrode includes at least a negative electrode active material and a polymer binder. The negative electrode active material includes at least a graphitic material and a silicon oxide material. The amount of acidic functional groups per unit surface area of graphitic material is not lower than 0.017 mmol/m$^2$ and not higher than 0.086 mmol/m$^2$. A polymer binder contains a carboxy group. Polymer binder has a main chain with a length not smaller than 0.53 μm and not greater than 2.13 μm.

9 Claims, 3 Drawing Sheets

(56) References Cited

FOREIGN PATENT DOCUMENTS

| JP | 2011198710 A | * | 10/2011 | | |
|---|---|---|---|---|---|
| JP | 2013-131486 A | | 7/2013 | | |
| JP | 2014022343 A | * | 2/2014 | .......... | H01M 4/1393 |
| JP | 2015088462 A | * | 5/2015 | .......... | H01M 4/1393 |
| JP | 2016-066508 A | | 4/2016 | | |
| JP | 2016-066529 A | | 4/2016 | | |
| JP | 2016201417 A | * | 12/2016 | | |

* cited by examiner

PAA

LITHIUM-ION SECONDARY BATTERY AND METHOD OF PRODUCING THE SAME

This nonprovisional application is based on Japanese Patent Application No. 2018-029759 filed on Feb. 22, 2018 with the Japan Patent Office, the entire contents of which are hereby incorporated by reference.

BACKGROUND

Field

The present disclosure relates to a lithium-ion secondary battery and a method of producing the same.

Description of the Background Art

Japanese Patent Laying-Open No. 2013-131486 discloses a negative electrode including a graphitic material and a silicon oxide material.

SUMMARY

As a negative electrode active material of a lithium-ion secondary battery, graphitic material is conventionally used. If the graphitic material is partially replaced by silicon oxide material, the battery capacity is expected to be increased. Such a mixed system of graphitic material and silicon oxide material, however, tends to lead to a low cycle capacity retention.

An object of the present disclosure is to improve cycle capacity retention of a lithium-ion secondary battery that includes a graphitic material and a silicon oxide material as negative electrode active materials.

In the following, the technical structure and the effects according to the present disclosure are described. It should be noted that part of an action mechanism according to the present disclosure is based on presumption. Therefore, the scope of claims should not be limited by whether or not the action mechanism is correct.

[1] A lithium-ion secondary battery includes at least a negative electrode, a positive electrode, and an electrolyte. The negative electrode includes at least a negative electrode active material and a polymer binder. The negative electrode active material includes at least a graphitic material and a silicon oxide material. The amount of acidic functional groups per unit surface area of the graphitic material is not lower than 0.017 mmol/m$^2$ and not higher than 0.086 mmol/m$^2$. The polymer binder contains a carboxy group. The polymer binder has a main chain with a length not smaller than 0.53 µm and not greater than 2.13 µm.

It is considered that in a mixed system of a graphitic material and a silicon oxide material, the graphitic material and the silicon oxide material are linked together by a polymer binder. It is considered that the polymer binder is adhered to a surface of the graphitic material and a surface of the silicon oxide material by, for example, the van der Waals forces or the anchoring effect. During the course of charge and discharge, the volume change of the silicon oxide material is considered to be more significant than the volume change of the graphitic material. A cause of this phenomenon is considered to be the weak bonding between the polymer binder and the graphitic material etc.; the weak bonding allows a gradual loosening of the linking between the graphitic material and the silicon oxide material during the course of repeated charge and discharge. It is considered that this loosening of the linking results in a low cycle capacity retention.

In the lithium-ion secondary battery according to the present disclosure, the polymer binder contains a carboxy group. The graphitic material contains an acidic functional group. It is expected that a carboxy group of the polymer binder and an acidic functional group (such as a carboxy group or a phenolic hydroxy group) of the graphitic material form a covalent bond together. It is considered that the covalent bond is formed by dehydration condensation reaction or esterification reaction, for example. The silicon oxide material is an oxide and is, therefore, considered to have a hydroxy group on a surface thereof. It is considered that a carboxy group of the polymer binder also forms a covalent bond with a hydroxy group of the silicon oxide material. It is considered that the formation of these covalent bonds allows the polymer binder to strongly link the graphitic material and the silicon oxide material together. This strong linking is expected to improve cycle capacity retention.

Here, the amount of acidic functional groups per unit surface area of the graphitic material is not lower than 0.017 mmol/m$^2$ and not higher than 0.086 mmol/m$^2$. An amount of acidic functional groups lower than 0.017 mmol/m$^2$ can lead to a decrease in cycle capacity retention. This potential decrease is considered to be caused as a result of a decrease in the number of sites at which the polymer binder and the graphitic material are bonded together.

An amount of acidic functional groups higher than 0.086 mmol/m$^2$ can also lead to a decrease in cycle capacity retention. The detailed mechanism of this phenomenon is unclear at this point, but the following mechanism can be envisaged. It is considered that the greater the number of sites at which the polymer binder and the graphitic material are bonded together is, the stronger the bonding between the polymer binder and the graphitic material is. But it is also considered that in a region where the bonding is too strong, a side reaction tends to occur between an acidic functional group of the graphitic material and the electrolyte. It is also considered that at the sites at which the polymer binder and the graphitic material are bonded together, movement of lithium ions is blocked. Therefore, it is considered that reactions vary between a region of a high density of binding sites and a region of a low density of binding sites.

A main chain of the polymer binder has a length not smaller than 0.53 µm and not greater than 2.13 µm. A main chain with a length smaller than 0.53 µm can lead to a decrease in cycle capacity retention. The reason is considered to be as follows: this short main chain is susceptible to craze formation in the molecular chain during the course of repeated volume changes in the graphitic material and in the silicon oxide material; and the crazes thus formed in the molecular chain loosen the linking between the graphitic material and the silicon oxide material.

A main chain with a length greater than 2.13 µm can also lead to a decrease in cycle capacity retention. The reason is considered to be as follows: because the main chain is long, many particles of the graphitic material and many particles of the silicon oxide material link to a single molecular chain; and as a result, this single molecular chain receives all the volume changes of these many particles of the graphitic material and the silicon oxide material at once, leading to a high likelihood of craze formation and other phenomena.

[2] The polymer binder may be, for example, at least one selected from the group consisting of carboxymethylcellulose, metal salts of carboxymethylcellulose, polyacrylic acid, and metal salts of polyacrylic acid. Each of these polymer binders contains a carboxy group and is capable of forming a covalent bond with, for example, an acidic functional group of the graphitic material.

[3] The polymer binder may have a weight average molecular weight not lower than 230,000 and not higher than 360,000, for example. When the weight average molecular weight is within this range, cycle capacity retention is expected to be improved.

[4] A method of producing a lithium-ion secondary battery according to the present disclosure includes at least the following (a) to (d):

(a) dissolving a polymer binder in water to prepare a polymer binder aqueous solution:

(b) dispersing a negative electrode active material in the polymer binder aqueous solution to prepare a negative-electrode-forming coating material;

(c) carrying out application of the negative-electrode-forming coating material and drying the negative-electrode-forming coating material to produce a negative electrode; and (d) producing a lithium-ion secondary battery including at least the negative electrode, a positive electrode, and an electrolyte, wherein the negative electrode active material includes at least a graphitic material and a silicon oxide material, the amount of acidic functional groups per unit surface area of the graphitic material is not lower than 0.017 mmol/m$^2$ and not higher than 0.086 mmol/m$^2$, and the polymer binder contains a carboxy group, and the polymer binder has a main chain with a length not smaller than 0.53 μm and not greater than 2.13 μm.

By the method of producing a lithium-ion secondary battery according to the present disclosure, the lithium-ion secondary battery described in any one of [1] to [3] above may be produced.

In the method of producing a lithium-ion secondary battery according to the present disclosure, it is expected that a covalent bond is formed between an acidic functional group of the graphitic material and the polymer binder due to, for example, the heat generated during the process of drying the negative-electrode-forming coating material. It is also expected that a covalent bond is formed between a hydroxy group of the silicon oxide material and the polymer binder.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below. Hereinafter, a lithium-ion secondary battery is also simply referred to as "battery".

<Lithium-Ion Secondary Battery>

Figure 1:
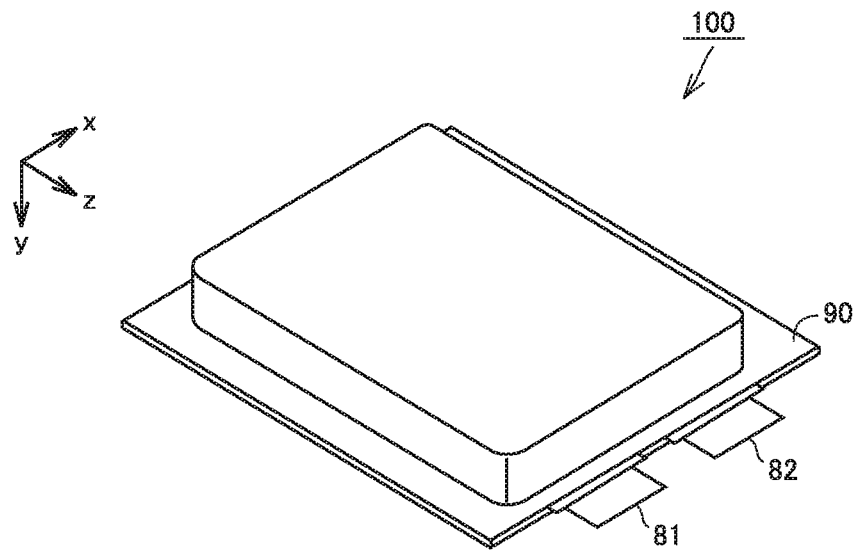
FIG. 1 is a first schematic view illustrating the structure of the lithium-ion secondary battery according to the present embodiment.

FIG. 1 is a first schematic view illustrating the structure of the lithium-ion secondary battery according to the present embodiment.

A battery 100 includes a casing 90. Casing 90 is a pouch made of an aluminum-laminated film. In other words, battery 100 is a laminate-type battery. Casing 90 may be made of metal, for example. Battery 100 may be a prismatic battery or a cylindrical battery, for example. Casing 90 is hermetically sealed. A negative electrode tab 82 and a positive electrode tab 81 are provided to allow for communication between inside and outside casing 90.

Figure 2:
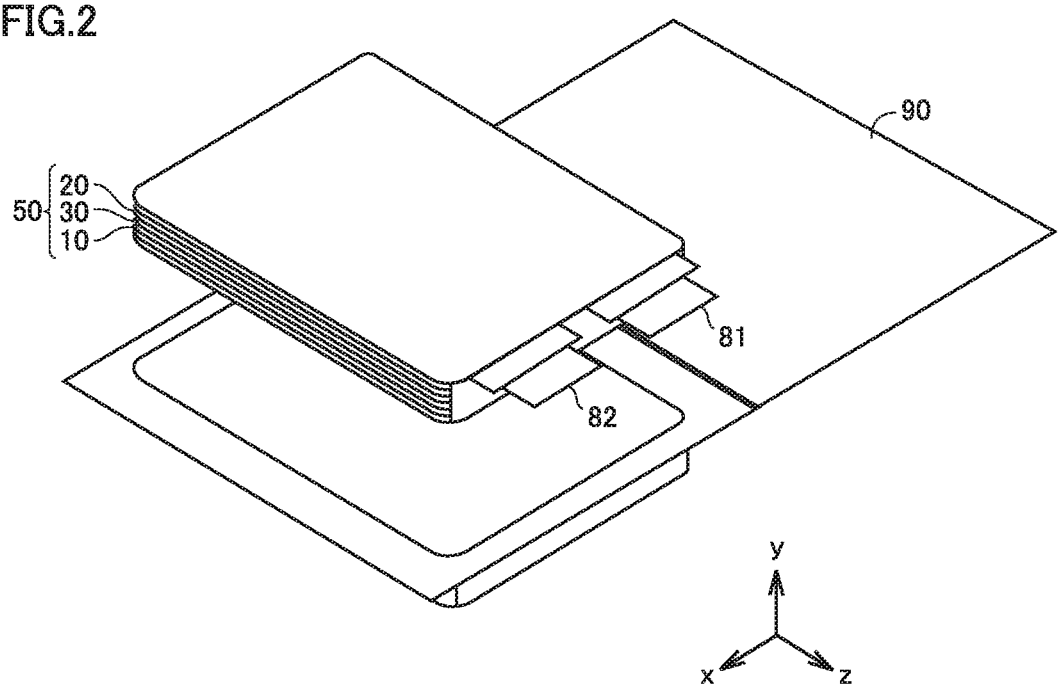
FIG. 2 is a second schematic view illustrating the structure of the lithium-ion secondary battery according to the present embodiment.

FIG. 2 is a second schematic view illustrating the structure of the lithium-ion secondary battery according to the present embodiment.

Casing 90 accommodates an electrode array 50 and an electrolyte (not shown). Electrode array 50 is a stack-type one. Electrode array 50 is formed by alternately stacking one negative electrode 20 and one positive electrode 10 and then repeating this alternate stacking process more than once. More specifically, battery 100 includes at least negative electrode 20, positive electrode 10, and the electrolyte. In each space between negative electrode 20 and positive electrode 10 in electrode array 50, a separator 30 is interposed. All negative electrodes 20 are electrically connected to negative electrode tab 82. All positive electrodes 10 are electrically connected to positive electrode tab 81.

Electrode array 50 may be a wound-type one. More specifically, electrode array 50 may be formed by stacking positive electrode 10, separator 30, and negative electrode 20 in this order and then winding them in a spiral fashion.

<<Negative Electrode>>

Negative electrode 20 is in sheet form. Negative electrode 20 includes at least a negative electrode active material and a polymer binder 23. Negative electrode 20 may further include a negative electrode current collector, for example. For example, a negative-electrode-forming coating material that contains the negative electrode active material, polymer binder 23, and water (solvent) may be applied to a surface of the negative electrode current collector, followed by drying, to produce negative electrode 20.

The negative electrode current collector may be made of copper (Cu) foil, for example. The negative electrode current collector may have a thickness not smaller than 5 μm and not greater than 30 μm, for example. By drying the negative-electrode-forming coating material, a negative electrode composite material layer may be formed. The negative electrode composite material layer thus includes the negative electrode active material and polymer binder 23. The negative electrode composite material layer may further include a conductive material, for example. The negative electrode composite material layer may have a thickness not smaller than 50 μm and not greater than 200 μm, for example.

(Negative Electrode Active Material)

Figure 3:
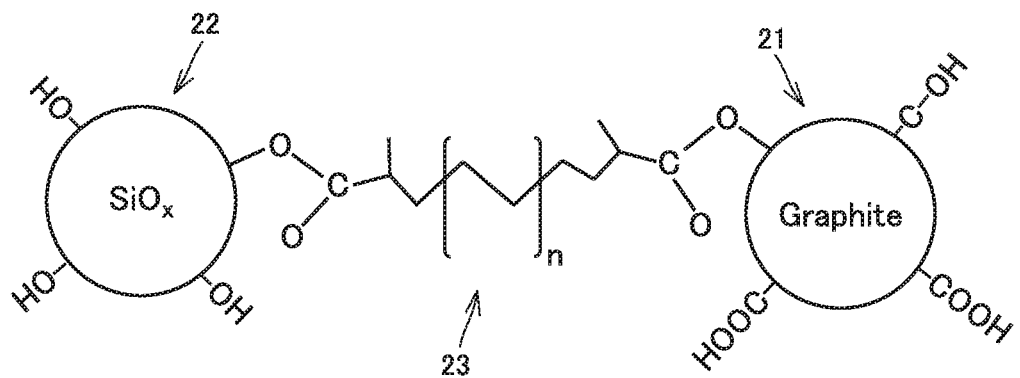
FIG. 3 is a conceptual view illustrating the negative electrode active material and the polymer binder according to the present embodiment.

FIG. 3 is a conceptual view illustrating the negative electrode active material and the polymer binder according to the present embodiment.

The negative electrode active material includes at least a graphitic material 21 and a silicon oxide material 22. Graphitic material 21 and silicon oxide material 22 are linked together by polymer binder 23.

(Graphitic Material)

Graphitic material 21 is typically a group of particles (powder). For convenience, only a single particle is shown in FIG. 3. Graphitic material 21 may have a D50 not lower than 1 μm and not higher than 30 μm, for example. The "D50" refers to the particle size in volume-based particle size distribution at which the cumulative particle volume (accumulated from the side of small sizes) reaches 50% of the total particle volume. The D50 may be measured with a laser-diffraction particle size distribution analyzer, for example. Graphitic material 21 may have a D50 not lower than 5 μm and not higher than 25 μm, for example. Graphitic material 21 may have a D50 not lower than 10 μm and not higher than 20 μm, for example.

The "graphitic material" refers to a carbon material containing graphite crystals and/or crystals similar to graphite crystals. Graphitic material 21 may be, for example, at least one selected from the group consisting of graphite, soft carbon, and hard carbon. The graphite may be natural graphite. The graphite may be artificial graphite. As long as graphitic material 21 contains graphite crystals and/or crystals similar to graphite crystals, graphitic material 21 may further contain a non-graphitic carbon material (amorphous carbon). For example, natural graphite (particles) coated with amorphous carbon on its surface may be used.

Graphitic material 21 contains an acidic functional group on a surface thereof. It is expected that the acidic functional group forms a covalent bond with a carboxy group of polymer binder 23. The "acidic functional group" may be a carboxy group (—COOH) and/or a phenolic hydroxy group (—OH), for example. The phenolic hydroxy group refers to a hydroxy group directly bonded to a benzene ring. The acidic functional group may be at least one selected from the group consisting of a carboxy group and a phenolic hydroxy group.

The amount of acidic functional groups per unit surface area of graphitic material 21 is not lower than 0.017 mmol/m$^2$ and not higher than 0.086 mmol/m$^2$. An amount of acidic functional groups lower than 0.017 mmol/m$^2$ can lead to a decrease in cycle capacity retention. An amount of acidic functional groups higher than 0.086 mmol/m$^2$ can also lead to a decrease in cycle capacity retention. The amount of acidic functional groups per unit surface area may be not lower than 0.021 mmol/m$^2$, for example. When the amount of acidic functional groups per unit surface area is within such a range, cycle capacity retention is expected to be improved.

The "amount of acidic functional groups per unit surface area" is calculated by dividing the amount of acidic functional groups per unit mass of graphitic material 21 by the BET specific surface area of the graphitic material. If the amount of acidic functional groups per unit surface area is expressed by a number with four or more decimal places, the number is rounded off to the third decimal place.

The "amount of acidic functional groups per unit mass" is measured by Boehm titration. Boehm titration involves the following steps: various alkalis are added to the carbon material; the carbon material reacts with the alkalis; the post-reaction concentrations of the alkalis are determined by back titration using an acid; and thus, the amount of acidic functional groups present on a surface of the carbon material is determined. In the measurement, a typical automatic potentiometric titrator or the like may be used.

In the present embodiment, about 10 g of graphitic material 21 is added to a 0.01 mol/L aqueous sodium hydroxide solution. After the addition of graphitic material 21, the resulting aqueous sodium hydroxide solution is stirred sufficiently. After the stirring, the supernatant is collected. The supernatant in an amount of 50 ml is titrated using 0.01 mol/L hydrochloric acid. Thus, the amount of acidic functional groups per unit mass is determined. It is considered that the amount of acidic functional groups per unit mass is the total of the amount of carboxy groups per unit mass and the amount of phenolic hydroxy groups per unit mass. Measurement of the amount of acidic functional groups per unit mass is carried out at least three times. The arithmetic mean of these at least three measurements is used.

The amount of acidic functional groups per unit mass of graphitic material 21 may be not lower than 0.084 mmol/g and not higher than 0.43 mmol/g, for example. The amount of acidic functional groups per unit mass of graphitic material 21 may be not lower than 0.102 mmol/g, for example.

The "BET specific surface area" is calculated by carrying out nitrogen-gas ($N_2$) adsorption-desorption measurement and then analyzing the resulting adsorption-desorption isotherm by the Brenauer-Emmet-Telle (BET) multi-point method. For the adsorption-desorption measurement, a typical specific-surface-area analyzer may be used. Measurement of the BET specific surface area is carried out at least three times. The arithmetic mean of these at least three measurements is used. Graphitic material 21 may have a BET specific surface area not smaller than 3 m$^2$/g and not greater than 6 m$^2$/g, for example. Graphitic material 21 may have a BET specific surface area not smaller than 4.9 m$^2$/g and not greater than 5 m$^2$/g, for example.

(Silicon Oxide Material)

Silicon oxide material 22 is typically a group of particles. Silicon oxide material 22 may have a D50 not lower than 1 μm and not higher than 30 μm, for example. Silicon oxide material 22 may have a D50 that is lower than the D50 of graphitic material 21. Silicon oxide material 22 may have a D50 not lower than 1 μm and lower than 10 μm, for example.

Silicon oxide material 22 is an oxide. Therefore, it is considered that hydroxy groups are present in abundance on a surface of silicon oxide material 22. It is expected that the hydroxy groups form covalent bonds with carboxy groups of polymer binder 23. Because the hydroxy groups are present in abundance, a predetermined amount of binding sites is considered to be successfully formed between silicon oxide material 22 and polymer binder 23 without requiring any specification of the amount of the hydroxy groups. It is considered that on a surface of silicon oxide material 22, oxygen is present as well. Oxygen of silicon oxide material 22 and a carboxy group of polymer binder 23 together may form a hydrogen bond, for example. It is considered that the formation of the hydrogen bond also improves the strength of bonding between silicon oxide material 22 and polymer binder 23.

The composition of silicon oxide material 22 may be represented by the following formula (I), for example:

$$SiO_x \qquad (I)$$

where x satisfies 0<x<2.

In the above formula (I), x may satisfy 0.5≤x≤1.5, for example. Silicon oxide material 22 may be a compound substantially consisting of silicon and oxygen. Silicon oxide material 22 may contain an element other than silicon or oxygen. For example, silicon oxide material 22 may contain a trace amount of an element that is inevitably entrapped during the course of synthesis.

For example, graphitic material 21 and silicon oxide material 22 may satisfy the following relationship:

(graphitic material):(silicon oxide material)=50:50 to 99:1(mass ratio).

For example, graphitic material 21 and silicon oxide material 22 may satisfy the following relationship:

(graphitic material):(silicon oxide material)=60:40 to 95:5(mass ratio).

For example, graphitic material 21 and silicon oxide material 22 may satisfy the following relationship:

(graphitic material):(silicon oxide material)=70:30 to 90:10(mass ratio).

(Polymer Binder)

Polymer binder 23 links graphitic material 21 and silicon oxide material 22 together. In other words, it is considered that graphitic material 21, silicon oxide material 22, and polymer binder 23 together form a composite material.

Polymer binder 23 contains a carboxy group. The carboxy group may be bonded to the main chain. The carboxy group may be bonded to an end of the main chain. The carboxy group may be bonded to a side chain. It is expected that the carboxy group of polymer binder 23 forms a covalent bond with an acidic functional group of graphitic material 21. It is expected that the carboxy group of polymer binder 23 forms a covalent bond with a hydroxy group of silicon oxide material 22. It is also expected that the carboxy group of polymer binder 23 forms a hydrogen bond with oxygen of silicon oxide material 22.

Polymer binder 23 may be at least one selected from the group consisting of carboxymethylcellulose (CMC), metal salts of CMC, polyacrylic acid (PAA), and metal salts of PAA, for example. Each metal salt may be a sodium (Na) salt or a lithium (Li) salt, for example. The metal salt of PAA may be produced by neutralization of a carboxy group of PAA with, for example, sodium hydroxide. The metal salt of PAA may also be called neutralized product. The degree of neutralization may be not lower than 30% and not higher than 70%, for example. The degree of neutralization refers to the ratio of the amount of neutralized carboxy groups (such as —COONa and —COOLi, for example) to the total amount of neutralized carboxy groups and unneutralized carboxy groups (—COOH). A neutralized product having a degree of neutralization higher than 0% and lower than 100% may also be called partially neutralized product. A neutralized product having a degree of neutralization of 100% may also be called fully neutralized product.

Polymer binder 23 may be linear. Polymer binder 23 may be branched. When polymer binder 23 is not linear, its longest molecular chain is regarded as its main chain. The length (L) of the main chain of polymer binder 23 is not smaller than 0.53 μm and not greater than 2.13 μm. A length (L) of the main chain smaller than 0.53 μm can lead to a decrease in cycle capacity retention. A length (L) of the main chain greater than 2.13 μm can also lead to a decrease in cycle capacity retention. The length (L) of the main chain may be not smaller than 0.81 μm, for example. The length (L) of the main chain may be not greater than 1.26 μm, for example. When the length (L) of the main chain is within such a range, cycle capacity retention is expected to be improved.

The length (L) of the main chain and the D50 of graphitic material 21 may satisfy a particular relationship. For example, the ratio (L/D50) of the length (L) of the main chain to the D50 of graphitic material 21 may be not lower than 0.03 and not higher than 0.14. When the ratio (L/D50) is within this range, it is considered that an appropriate number of particles of graphitic material 21 are linked together by a single molecular chain and consequently cycle capacity retention is improved.

The "length (L) of the main chain" is calculated from the interatomic bond distance and the degree of polymerization. In the present specification, the method of calculating the length (L) of the main chain is described by using the main chain of CMC and that of PAA as examples.

Figure 4:
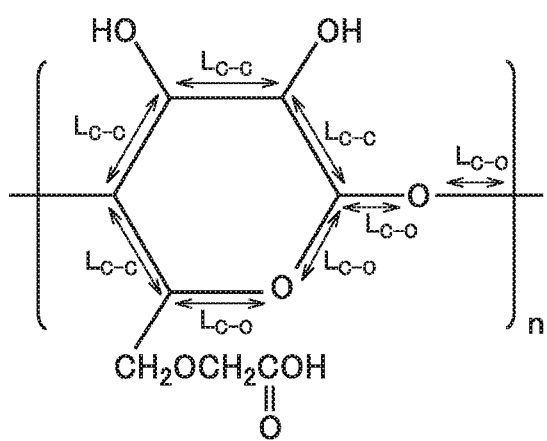
FIG. 4 is a drawing illustrating the length of the main chain of carboxymethylcellulose.

FIG. 4 is a drawing illustrating the length of the main chain of carboxymethylcellulose.

In CMC, it is considered that the bond distance ($L_{C-C}$) of each C—C bond in the repeating unit is 154 μm and the bond distance ($L_{C-O}$) of each C—O bond is 143 μm. The length (L) of the main chain is calculated by the following formula (II):

$$\text{Length } (L) \text{ of main chain} = [\{L_{C-C} \times 3 + (L_{C-C} + L_{C-O} + L_{C-O})\}/2 + L_{C-O} \times 2] \times n \quad (II)$$

where n represents the degree of polymerization. The method of calculating the length (L) of the main chain of a metal salt of CMC is the same as the method of calculating the length (L) of the main chain of CMC.

Figure 5:
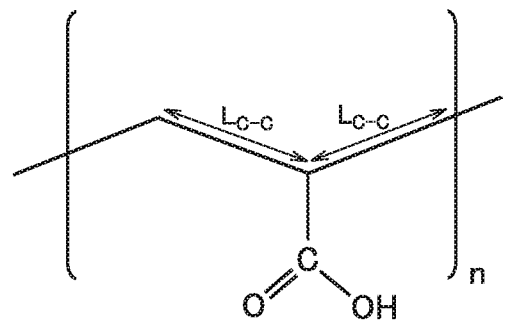
FIG. 5 is a drawing illustrating the length of the main chain of polyacrylic acid.

FIG. 5 is a drawing illustrating the length of the main chain of polyacrylic acid.

In PAA, it is considered that the bond distance ($L_{C-C}$) of each C—C bond in the repeating unit is 154 μm. The length of the main chain is calculated by the following formula (III):

$$\text{Length } (L) \text{ of main chain} = L_{C-C} \times 2 \times n \quad (III)$$

where n represents the degree of polymerization. The method of calculating the length (L) of the main chain of a metal salt of PAA is the same as the method of calculating the length (L) of the main chain of PAA.

The "degree of polymerization (n)" is calculated by dividing the weight average molecular weight (Mw) of polymer binder 23 by the chemical formula weight of the repeating unit. If the degree of polymerization (n) thus calculated is expressed by a number with any decimal place, the number is rounded off to the closest whole number. The chemical formula weight of the repeating unit of CMC is calculated by the following formula (IV):

$$\text{Chemical formula weight} = 162 - \alpha + 81 \times \alpha \quad (IV)$$

where α represents the degree of etherification. The "degree of etherification (α)" refers to the average number of hydroxy group(s) substituted with carboxymethyl group(s) (—OCH$_2$COOH or —OCH$_2$COONa), out of three hydroxy groups (—OH) in a single repeating unit. When the degree of etherification (a) is zero, for example, the chemical formula weight of the repeating unit is 162 as calculated by the above formula (IV). When the degree of etherification (α) is 1, for example, the chemical formula weight of the repeating unit is 242 as calculated by the above formula (IV). When the degree of etherification (α) is 0.6, for example, the chemical formula weight of the repeating unit is 210 as calculated by the above formula (IV). In the present embodiment, the degree of etherification (α) of CMC may be not lower than 0.5 and not higher than 0.7, for example.

The "weight average molecular weight (Mw)" may be measured by size exclusion chromatography (SEC) or matrix-assisted laser desorption/ionization time-of-flight mass spectrometry (MALDI-TOF/MS), for example. When the weight average molecular weight (Mw) measured by SEC does not agree with the weight average molecular weight (Mw) measured by MALDI-TOF/MS, the greater one among the two weight average molecular weights (Mw) is used.

Polymer binder 23 may have a weight average molecular weight (Mw) not lower than 230,000 and not higher than 1,000,000, for example. Polymer binder 23 may have a weight average molecular weight (Mw) not lower than 230,000 and not higher than 360,000, for example. When the weight average molecular weight (Mw) is within these ranges, cycle capacity retention is expected to be improved.

The content of polymer binder 23 may be, for example, not lower than 0.1 part by mass and not higher than 10 parts by mass relative to 100 parts by mass of the negative electrode active material. The content of polymer binder 23 may be, for example, not lower than 1 part by mass and not higher than 5 parts by mass relative to 100 parts by mass of the negative electrode active material.

(Other Components)

As long as negative electrode 20 includes polymer binder 23 containing a carboxy group, negative electrode 20 may further include a polymer binder containing no carboxy group. Examples of the polymer binder containing no carboxy group include styrene-butadiene rubber (SBR).

Negative electrode 20 may further include a conductive material. The conductive material refers to an electronically-conductive material. The conductive material may be carbon black (such as acetylene black), carbon short fibers, and/or carbon nanotubes, for example. Negative electrode 20 may include only one type of the conductive material. Negative electrode 20 may include two or more types of the conductive material. The content of the conductive material may be, for example, not lower than 0.1 part by mass and not higher than 10 parts by mass relative to 100 parts by mass of the negative electrode active material.

<<Positive Electrode>>

Positive electrode 10 is in sheet form. Positive electrode 10 includes at least a positive electrode active material. Positive electrode 10 may further include a conductive material, a polymer binder, and a positive electrode current collector. For example, a positive-electrode-forming coating material that contains the positive electrode active material, the conductive material, the polymer binder, and a solvent may be applied to a surface of the positive electrode current collector, followed by drying, to produce positive electrode 10.

The positive electrode current collector may be made of aluminum (Al) foil, for example. The positive electrode current collector may have a thickness not smaller than 5 μm and not greater than 30 μm, for example. By drying the positive-electrode-forming coating material, a positive electrode composite material layer may be formed. The positive electrode composite material layer thus includes the positive electrode active material, the conductive material, and the polymer binder. The positive electrode composite material layer may have a thickness not smaller than 50 μm and not greater than 200 μm, for example.

The positive electrode active material is typically a group of particles. The positive electrode active material may have a D50 not lower than 1 μm and not higher than 30 μm, for example. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and/or $LiMn_2O_4$), lithium nickel cobalt manganese oxide (such as $LiNi_{1/3}Co_{1/3}Mn_{1/3}O_2$ and/or $LiNi_{0.5}Co_{0.2}Mn_{0.3}O_2$), lithium nickel cobalt aluminate (such as $LiNi_{0.82}Co_{0.15}Al_{0.03}O_2$), and/or lithium iron phosphate ($LiFePO_4$), for example. Positive electrode 10 may include only one type of the positive electrode active material. Positive electrode 10 may include two or more types of the positive electrode active material.

The conductive material is not particularly limited. The conductive material may be, for example, a material described above as an example of the conductive material contained in negative electrode 20. The content of the conductive material may be, for example, not lower than 0.1 part by mass and not higher than 10 parts by mass relative to 100 parts by mass of the positive electrode active material. The polymer binder is not particularly limited. The polymer binder may be polyvinylidene difluoride (PVdF) and/or vinylidene fluoride-hexafluoropropene copolymer (PVdF-HFP), for example. The content of the polymer binder may be, for example, not lower than 0.1 part by mass and not higher than 10 parts by mass relative to 100 parts by mass of the positive electrode active material.

<<Electrolyte>>

The electrolyte is a lithium-ion conductor. The electrolyte may be liquid.

The electrolyte may be gel. The electrolyte may be solid. The electrolyte may be electrolyte solution or ionic liquid, for example. In the present specification, the electrolyte in the form of electrolyte solution is described as an example.

The electrolyte solution contains at least a supporting salt and a solvent. The electrolyte solution may contain the supporting salt in an amount not lower than 0.5 mol/L and not higher than 2 mol/L (not lower than 0.5 M and not higher than 2 M), for example. The supporting salt is dissolved in the solvent. The supporting salt may be $LiPF_6$, $LiBF_4$, $Li[N(FSO_2)_2]$, and/or $Li[N(CF_3SO_2)_2]$, for example. The electrolyte solution may contain only one type of the supporting salt. The electrolyte solution may contain two or more types of the supporting salt.

The solvent is aprotic. The solvent may be a mixture of a cyclic carbonate and a chain carbonate, for example. The mixing ratio may be "(cyclic carbonate):(chain carbonate)=1:9 to 5:5 (volume ratio)", for example.

The cyclic carbonate may be ethylene carbonate (EC), propylene carbonate (PC), butylene carbonate (BC), and/or fluoroethylene carbonate (FEC), for example. The solvent may contain only one type of the cyclic carbonate. The solvent may contain two or more types of the cyclic carbonate.

The chain carbonate may be dimethyl carbonate (DMC), ethyl methyl carbonate (EMC), and/or diethyl carbonate (DEC), for example. The solvent may contain only one type of the chain carbonate. The solvent may contain two or more types of the chain carbonate.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various additives in addition to the supporting salt and the solvent. The electrolyte solution may contain the additives in an amount not lower than 0.005 mol/L and not higher than 0.5 mol/L, for example. Examples of the additives include a gas generation agent (also called anti-overcharging additive), a solid electrolyte interface (SEI) film-forming agent, and a flame retardant. The gas generation agent may be cyclohexylbenzene (CHB) and/or biphenyl (BP), for example. The SEI-film-forming agent may be vinylene carbonate (VC), vinylethylene carbonate (VEC), Li[B($C_2O_4$)$_2$], $LiPO_2F_2$, propane sultone (PS), and/or ethylene sulfite (ES), for example. The flame retardant may be a phosphoric acid ester and/or a phosphazene, for example.

<<Separator>>

Battery 100 may include separator 30. Separator 30 is insulating. Separator 30 is interposed between negative electrode 20 and positive electrode 10. Negative electrode 20 and positive electrode 10 are separated from each other by separator 30. Separator 30 is a porous film. Separator 30 allows the electrolyte solution to pass therethrough. Separator 30 may have a thickness not smaller than 10 μm and not greater than 30 μm, for example. Separator 30 may be a polyolefin porous film, for example.

Separator 30 may have a monolayer structure. Separator 30 may consist of a polyethylene (PE) porous film, for example. Separator 30 may have a multilayer structure. Separator 30 may be formed by stacking a polypropylene (PP) porous film, a PE porous film, and a PP porous film in this order, for example. Separator 30 may have a heat-resistant film on a surface thereof. The heat-resistant film contains a heat-resistant material. The heat-resistant material may be boehmite, silica, and/or titania, for example. When the electrolyte is solid, separator 30 may be unnecessary.

<Method of Producing Lithium-Ion Secondary Battery>

Next, the method of producing a lithium-ion secondary battery according to the present embodiment is described.

Figure 6:
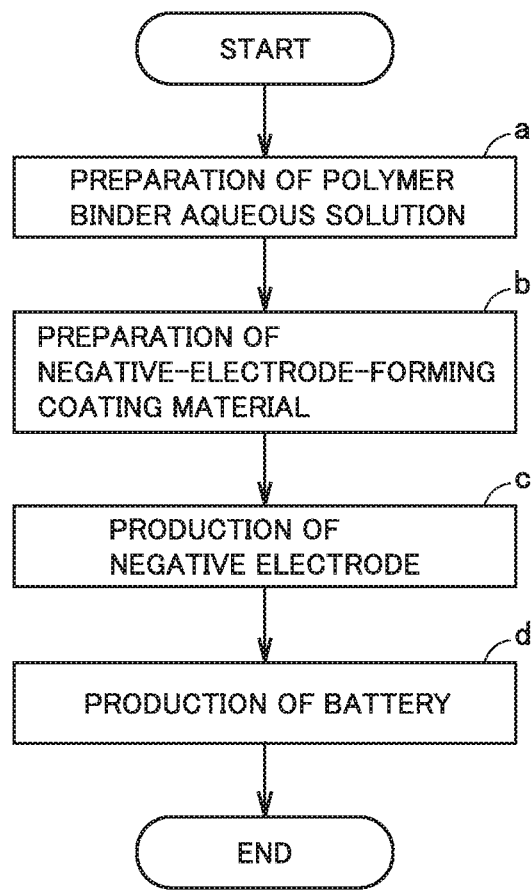
FIG. 6 is a flow chart schematically illustrating the method of producing a lithium-ion secondary battery according to the present embodiment.

FIG. 6 is a flow chart schematically illustrating the method of producing a lithium-ion secondary battery according to the present embodiment. The method of producing a battery according to the present embodiment includes at least "(a) preparation of the polymer binder aqueous solution", "(b) preparation of the negative-electrode-forming coating material", "(c) production of the negative electrode", and "(d) production of the battery".

<<(a) Preparation of Polymer Binder Aqueous Solution>>

The method of producing a battery according to the present embodiment includes dissolving polymer binder 23 in water to prepare a polymer binder aqueous solution.

For example, polymer binder 23 in powder form is added to water. The resulting mixture of polymer binder 23 and water is stirred. Thus, a polymer binder aqueous solution may be prepared. In the stirring process, a typical stirring apparatus may be used.

Polymer binder 23 is described above in detail. More specifically, polymer binder 23 contains a carboxy group. The length of the main chain of polymer binder 23 is not smaller than 0.53 μm and not greater than 2.13 μm. Desirably, polymer binder 23 is substantially thoroughly dissolved in water. The concentration of the polymer binder aqueous solution may be changed as appropriate depending on, for example, the type and the weight average molecular weight (Mw) of polymer binder 23. The concentration of the polymer binder aqueous solution may be not lower than 0.1 mass % and not higher than 5 mass %, for example.

<<(b) Negative-Electrode-Forming Coating Material>>

The method of producing a battery according to the present embodiment includes dispersing a negative electrode active material in the polymer binder aqueous solution to prepare a negative-electrode-forming coating material.

For example, a negative electrode active material in powder form is added to the polymer binder aqueous solution. The resulting mixture of the negative electrode active material and the polymer binder aqueous solution is stirred. Thus, a negative-electrode-forming coating material may be prepared. In the stirring process, a typical stirring apparatus may be used. To the resulting negative-electrode-forming coating material, a polymer binder containing no carboxy group (such as SBR), a conductive material (such as carbon black), and/or the like may further be mixed. The negative-electrode-forming coating material may have a solid-content ratio not lower than 40 mass % and not higher than 70 mass %, for example. The solid-content ratio refers to a mass ratio of all the components in the negative-electrode-forming coating material except water (solvent).

The pH of the negative-electrode-forming coating material may be adjusted to not lower than 7 and not higher than 9, for example. When the pH of the negative-electrode-forming coating material is lower than 7, lithium hydroxide or the like may be added to the negative-electrode-forming coating material so as to adjust the pH to not lower than 7 and not higher than 9.

The negative electrode active material is described above in detail. More specifically, the negative electrode active material includes at least graphitic material 21 and silicon oxide material 22. The amount of acidic functional groups per unit surface area of graphitic material 21 is not lower than 0.017 mmol/$m^2$ and not higher than 0.086 mmol/$m^2$.

The method of producing a battery according to the present embodiment may include adjusting the amount of acidic functional groups per unit surface area of graphitic material 21 to fall within the range from 0.017 mmol/$m^2$ to 0.086 mmol/$m^2$. The amount of acidic functional groups tends to be decreased by subjecting graphitic material 21 to heat treatment in, for example, an inert atmosphere or a reducing atmosphere. The amount of acidic functional groups tends to be increased by subjecting graphitic material 21 to heat treatment in, for example, an oxidizing atmosphere.

The inert atmosphere may be a nitrogen gas ($N_2$) atmosphere, for example. The reducing atmosphere may be, for example, a mixed-gas atmosphere containing nitrogen gas ($N_2$) and hydrogen gas ($H_2$). The concentration of hydrogen gas may be not lower than 1 volume % and not higher than 3 volume %, for example. The oxidizing atmosphere may be, for example, a mixed-gas atmosphere containing nitrogen gas ($N_2$) and oxygen gas ($O_2$). The concentration of oxygen gas may be not lower than 1 volume % and not higher than 3 volume %, for example.

The temperature for the heat treatment may be not lower than 300° C. and not higher than 1300° C., for example. The duration of the heat treatment may be not shorter than one hour and not longer than three hours, for example. Desirably, the heat treatment in the oxidizing atmosphere is carried out under such conditions that do not allow excessive progress of oxidation of graphitic material 21. When oxidation of graphitic material 21 proceeds excessively, the mass of graphitic material 21 may decrease.

Instead of the heat treatment, plasma treatment in an oxidizing atmosphere, among others, may be carried out for adjustment of the amount of acidic functional groups.

<<(c) Production of Negative Electrode>>

The method of producing a battery according to the present embodiment includes carrying out application of the negative-electrode-forming coating material and drying the negative-electrode-forming coating material to produce negative electrode 20.

For example, the negative-electrode-forming coating material may be applied to a surface of the negative electrode current collector (such as Cu foil), followed by drying, to form the negative electrode composite material layer. Thus, negative electrode 20 is produced. In the application process, a typical applicator may be used. In the drying process, a hot-air drying furnace may be used, for example. In order to attain a predetermined thickness of the negative electrode composite material layer, negative electrode 20 may be compressed. In order to meet the specification of battery 100, negative electrode 20 may be cut into predetermined planar dimensions.

While the negative-electrode-forming coating material is being dried, the negative-electrode-forming coating material may be heated to a temperature not lower than 80° C. and not higher than 150° C. After the negative-electrode-forming coating material is dried, negative electrode 20 may be heated to a temperature not lower than 80° C. and not higher than 150° C. It is expected that these processes lead to formation of a covalent bond between an acidic functional group of graphitic material 21 and a carboxy group of polymer binder 23. It is also expected that these processes further lead to formation of a covalent bond between a hydroxy group or the like of silicon oxide material 22 and a carboxy group of polymer binder 23.

Only the negative-electrode-forming coating material, among the negative-electrode-forming coating material and negative electrode 20, may be heated to a temperature not lower than 80° C. and not higher than 150° C. Only negative electrode 20, among the negative-electrode-forming coating material and negative electrode 20, may be heated to a temperature not lower than 80° C. and not higher than 150° C. Both the negative-electrode-forming coating material and negative electrode 20 may be heated to a temperature not lower than 80° C. and not higher than 150° C. In other words, at least one of the negative-electrode-forming coating material and negative electrode 20 may be heated to a temperature not lower than 80° C. and not higher than 150° C.

<<(d) Production of Battery>>

The method of producing a battery according to the present embodiment includes producing battery 100 that includes at least negative electrode 20, positive electrode 10, and the electrolyte.

Positive electrode 10 is prepared. Positive electrode 10 is described above in detail. Positive electrode 10 may be prepared by a conventionally known method. For example, the positive-electrode-forming coating material that contains the positive electrode active material, the conductive material, the polymer binder, and the solvent may be applied to a surface of the positive electrode current collector, followed by drying, to prepare positive electrode 10.

Electrode array 50 is formed. For example, electrode array 50 is formed by alternately stacking one negative electrode 20 and one positive electrode 10 and then repeating this alternate stacking process more than once. In each space between negative electrode 20 and positive electrode 10, separator 30 may be interposed. Separator 30 is described above in detail. To electrode array 50, negative electrode tab 82 and positive electrode tab 81 are attached.

Casing 90 is prepared. Casing 90 is described above in detail. Into casing 90, electrode array 50 and the electrolyte are placed. Casing 90 is hermetically sealed. In this way, battery 100 may be produced.

EXAMPLES

In the following, examples according to the present disclosure are described. The scope of claims is not limited to the description below.

Comparative Example 1

<<(a) Preparation of Polymer Binder Aqueous Solution>>

The materials described below were prepared.
Polymer binder: CMC
Weight average molecular weight (Mw)=230,000
Degree of etherification ($\alpha$)=0.6
Length (L) of main chain=0.81 μm
Water: ion-exchanged water Polymer binder 23 was dissolved in ion-exchanged water, and thus a polymer binder aqueous solution was prepared.

<<(b) Preparation of Negative-Electrode-Forming Coating Material>>

The materials described below were prepared.
Graphitic material: spheronized natural graphite
D50=15.5 μm
BET specific surface area=4.8 $m^2/g$
Amount of acidic functional groups per unit mass=0.073 mmol/g
Amount of acidic functional groups per unit surface area=0.015 $mmol/m^2$
Silicon oxide material: SiO [$SiO_x$ (x=1)]
Conductive material: acetylene black (AB)
Polymer binder (containing no carboxy group): SBR Under a flow of nitrogen gas (98 volume %) and hydrogen gas (2 volume %) (namely in a reducing atmosphere), graphitic material 21 was subjected to heat treatment at 1300° C. for three hours. In the present specification, this set of heat treatment conditions is called "condition No. 1" (see Table 1 below). After heat treatment, the amount of acidic functional groups per unit mass was 0.033 mmol/g and the amount of acidic functional groups per unit surface area was 0.07 $mmol/m^2$.

Graphitic material 21 obtained after heat treatment, silicon oxide material 22, AB, SBR, and the polymer binder aqueous solution were mixed, and thus a negative-electrode-forming coating material was prepared. The mixing ratio of solid contents in the negative-electrode-forming coating material was "(graphitic material):(silicon oxide material):AB:CMC:SBR=75:20:1:3:1 (mass ratio)".

<<(c) Production of Negative Electrode>>

As the negative electrode current collector, a sheet of Cu foil (thickness, 10 μm) was prepared. The negative-electrode-forming coating material was applied to a surface of the negative electrode current collector with an applicator. The negative-electrode-forming coating material was dried in a hot-air drying furnace at 80° C. for 10 minutes. Thus, a negative electrode composite material layer was formed. The resulting negative electrode composite material layer was compressed. After compression, the negative electrode composite material layer had a thickness of 60 μm. In this way, negative electrode 20 was produced. Negative electrode 20 was cut. After cutting, negative electrode 20 had a square shape. Negative electrode 20 after cutting had planar dimensions of 30 mm in length and 30 mm in width.

<<(d) Production of Battery>>

Positive electrode 10 was prepared. Positive electrode 10 had a structure described below.

(Structure of Positive Electrode)
Positive electrode active material: $LiNi_{0.5}Co_{0.2}Mn_{0.3}O_2$
Conductive material: AB
Polymer binder: PVdF
Mixing ratio: (positive electrode active material):(conductive material):(polymer binder)=95:2:3 (mass ratio)
Positive electrode current collector: Al foil (thickness, 15 μm)
Positive electrode composite material layer: 80 μm in thickness
Planar dimensions: 30 mm in length and 30 mm in width
Separator 30 was prepared. Separator 30 had a thickness of 20 μm.
Separator 30 had a three-layer structure. More specifically, separator 30 was formed by stacking a PP porous film, a PE porous film, and a PP porous film in this order.
Negative electrode 20, separator 30, and positive electrode 10 were stacked so that negative electrode 20 and positive electrode 10 faced to each other with separator 30 interposed therebetween. Thus, electrode array 50 was formed. Casing 90 was prepared. Casing 90 was a pouch made of an aluminum-laminated film. Electrode array 50 was placed in casing 90. 1 g of an electrolyte solution (electrolyte) was injected into casing 90. The electrolyte solution had a composition described below.

(Composition of Electrolyte Solution)
Supporting salt: $LiPF_6$ (1 mol/L)
Solvent: [EC:EMC=1:3 (volume ratio)]
Casing 90 was hermetically sealed. In this way, battery 100 (lithium-ion secondary battery) was produced. The design capacity of battery 100 was 30 mAh.

<<Activation and Initial Capacity Determination>>
Battery 100 was charged to 4.2 V at a constant current of 0.15 mA. Battery 100 was rested for 30 minutes and then discharged to 2.5 V at a constant current of 0.15 mA. In this way, the initial capacity (initial discharged capacity) was measured.

Comparative Examples 2 to 11, Examples 1 to 7

The amount of acidic functional groups in graphitic material 21 was adjusted by carrying out heat treatment under each set of conditions specified in Table 1 below. Under condition No. 9, the mass of graphitic material 21 decreased by a great margin. It is considered that oxidation of graphitic material 21 proceeded excessively and carbon dioxide was generated. Therefore, no battery 100 was produced when condition No. 9 was adopted.

TABLE 1

List of conditions of heat treatment of graphitic material

| | Atmosphere | Temperature | Time | Notes |
|---|---|---|---|---|
| Condition No. 1 | $N_2$ (98 vol %) + $H_2$ (2 vol %) | 1300° C. | 3 hours | — |
| Condition No. 2 | $N_2$ (100 vol %) | 1300° C. | 1 hour | — |
| Condition No. 3 | No treatment | | | — |
| Condition No. 4 | $N_2$ (98 vol %) + $O_2$ (2 vol %) | 300° C. | 1 hour | — |
| Condition No. 5 | $N_2$ (98 vol %) + $O_2$ (2 vol %) | 300° C. | 3 hours | — |
| Condition No. 6 | $N_2$ (98 vol %) + $O_2$ (2 vol %) | 400° C. | 1 hour | — |
| Condition No. 7 | $N_2$ (98 vol %) + $O_2$ (2 vol %) | 500° C. | 1 hour | — |
| Condition No. 8 | $N_2$ (98 vol %) + $O_2$ (2 vol %) | 600° C. | 1 hour | — |
| Condition No. 9 | $N_2$ (98 vol %) + $O_2$ (2 vol %) | 700° C. | 1 hour | Great decrease in mass |

Polymer binder aqueous solutions containing respective polymer binders specified in Table 2 below were prepared

TABLE 2

List of polymer binders

| Type | Abbreviation | Carboxy group | Weight average molecular weight (Mw) | Length of main chain (L) |
|---|---|---|---|---|
| Polyacrylic acid | PAA | Yes | 25,000 | 0.05 μm |
| Carboxymethylcellulose | CMC | Yes | 63,300 | 0.22 μm |
| Polyacrylic acid | PAA | Yes | 250,000 | 0.53 μm |
| Carboxymethylcellulose | CMC | Yes | 230,000 | 0.81 μm |
| Polyacrylic acid | PAA | Yes | 1,000,000 | 2.13 μm |
| Carboxymethylcellulose | CMC | Yes | 360,000 | 1.26 μm |
| Polyacrylic acid Na salt (partially neutralized product) | (PAA)(PAA-Na) | Yes | 4,500,000 | 9.59 μm |
| Polyvinyl alcohol | PVA | No | 22,000 | 0.08 μm |
| Polyethylene glycol | PEG | No | 10,000 | 0.1 μm |
| Polyvinyl alcohol | PVA | No | 88,000 | 0.31 μm |
| Polyethylene glycol | PEG | No | 500,000 | 5 μm |

By using respective combinations specified in Table 3 below, negative-electrode-forming coating materials were prepared. To a negative-electrode-forming coating material that had a pH lower than 7 during the course of preparation, lithium hydroxide was added so as to adjust the pH to fall within the range from 7 to 9.

Except the above process, the same manner as in Comparative Example 1 was adopted, and thus battery 100 was produced. All batteries 100 had initial capacities within the range from 28 mAh to 32 mAh with minor variations.

21 was lower than 0.017 mmol/m$^2$, the bond strength between graphitic material 21 and polymer binder 23 was low.

In Comparative Example 4, cycle capacity retention was low. It is considered that because the amount of acidic functional groups per unit surface area of graphitic material 21 was greater than 0.086 mmol/m$^2$, phenomena such as side reactions of the electrolyte solution and variations in reactions readily occurred.

TABLE 3

List of Examples and Comparative Examples

| | Negative electrode active material | | | | | | Polymer binder | | | |
|---|---|---|---|---|---|---|---|---|---|---|
| | Graphitic material | | | | | | | | | |
| | Heat treatment condition No. — | D50 μm | BET specific surface area m$^2$/g | Amount of acidic functional groups per unit mass mmol/g | Amount of acidic functional groups per unit surface area mmol/m$^2$ | Silicon oxide material — | Type | Weight average molecular weight (Mw) — | Carboxy group — | Length of main chain (L) μm | Evaluation Cycle capacity retention % |
| Comp. Ex. 1 | Condition No. 1 | 15.5 | 4.8 | 0.033 | 0.007 | SiO | CMC | 230,000 | Yes | 0.81 | 28.3 |
| Comp. Ex. 2 | Condition No. 2 | 15.5 | 4.9 | 0.068 | 0.014 | SiO | CMC | 230,000 | Yes | 0.81 | 45.9 |
| Comp. Ex. 3 | Condition No. 3 | 15.5 | 4.9 | 0.073 | 0.015 | SiO | CMC | 230,000 | Yes | 0.81 | 59.1 |
| Ex. 1 | Condition No. 4 | 15.5 | 4.9 | 0.084 | 0.017 | SiO | CMC | 230,000 | Yes | 0.81 | 82.3 |
| Ex. 2 | Condition No. 5 | 15.5 | 4.9 | 0.102 | 0.021 | SiO | CMC | 230,000 | Yes | 0.81 | 90.9 |
| Ex. 3 | Condition No. 6 | 15.5 | 4.9 | 0.210 | 0.043 | SiO | CMC | 230,000 | Yes | 0.81 | 86.7 |
| Ex. 4 | Condition No. 7 | 15.5 | 5 | 0.430 | 0.086 | SiO | CMC | 230,000 | Yes | 0.81 | 88.8 |
| Comp. Ex. 4 | Condition No. 8 | 15.5 | 5.1 | 0.650 | 0.127 | SiO | CMC | 230,000 | Yes | 0.81 | 74.8 |
| Comp. Ex. 5 | Condition No. 4 | 15.5 | 4.9 | 0.084 | 0.017 | SiO | PAA | 25,000 | Yes | 0.05 | 59.1 |
| Comp. Ex. 6 | Condition No. 4 | 15.5 | 4.9 | 0.084 | 0.017 | SiO | CMC | 63,300 | Yes | 0.22 | 67.7 |
| Ex. 5 | Condition No. 4 | 15.5 | 4.9 | 0.084 | 0.017 | SiO | PAA | 250,000 | Yes | 0.53 | 79.4 |
| Ex. 6 | Condition No. 4 | 15.5 | 4.9 | 0.084 | 0.017 | SiO | CMC | 360,000 | Yes | 1.26 | 86.7 |
| Ex. 7 | Condition No. 4 | 15.5 | 4.9 | 0.084 | 0.017 | SiO | PAA | 1,000,000 | Yes | 2.13 | 82.8 |
| Comp. Ex. 7 | Condition No. 4 | 15.5 | 4.9 | 0.084 | 0.017 | SiO | (PAA)(PAA-Na) | 4,500,000 | Yes | 9.59 | 67.8 |
| Comp. Ex. 8 | Condition No. 4 | 15.5 | 4.9 | 0.084 | 0.017 | SiO | PVA | 22,000 | No | 0.08 | 27.6 |
| Comp. Ex. 9 | Condition No. 4 | 15.5 | 4.9 | 0.084 | 0.017 | SiO | PEG | 10,000 | No | 0.1 | 25.5 |
| Comp. Ex. 10 | Condition No. 4 | 15.5 | 4.9 | 0.084 | 0.017 | SiO | PVA | 88,000 | No | 0.31 | 22.1 |
| Comp. Ex. 11 | Condition No. 4 | 15.5 | 4.9 | 0.084 | 0.017 | SiO | PEG | 500,000 | No | 5 | 28.1 |

<Evaluation>

50 charge-discharge cycles were carried out. A single cycle contained charge→rest→discharge→rest as described below. The discharged capacity measured after the 50th cycle was divided by the initial capacity, and thus the cycle capacity retention was calculated. Results are shown in Table 3 above.

Charge: constant-current-constant-voltage mode (constant current=15 mA cutoff current=0.15 mA)

Rest: 10 minutes

Discharge: constant-current-constant-voltage mode (constant current=15 mA, cutoff current=0.15 mA)

Rest: 10 minutes

<Results>

In Comparative Examples 1 to 3, cycle capacity retention was low. It is considered that because the amount of acidic functional groups per unit surface area of graphitic material In Examples 1 to 4, cycle capacity retention was high. In Examples 1 to 4, the amount of acidic functional groups per unit surface area of graphitic material 21 was not lower than 0.017 mmol/m$^2$ and not higher than 0.086 mmol/m$^2$.

In Comparative Examples 5 and 6, cycle capacity retention was low. It is considered that because the length (L) of the main chain of polymer binder 23 was smaller than 0.53 μm, repeated volume changes in graphitic material 21 and silicon oxide material 22 led to craze formation in the molecular chain and consequently loosened the linking between graphitic material 21 and silicon oxide material 22.

In Comparative Example 7, cycle capacity retention was low. It is considered that because the length (L) of the main chain of polymer binder 23 was greater than 2.13 μm, a single molecular chain received all the volume changes of many particles of graphitic material 21 and many particles of silicon oxide material 22 at once, which caused craze formation and other phenomena in the molecular chain and consequently loosened the linking between graphitic material 21 and silicon oxide material 22.

In Examples 5 to 7, cycle capacity retention was high. In Examples 5 to 7, the length (L) of the main chain of polymer binder 23 was not smaller than 0.53 μm and not greater than 2.13 μm.

In Comparative Examples 8 to 11, cycle capacity retention was low. It is considered that because polymer binder 23 contained no carboxy group, no covalent bonds were formed between polymer binder 23 and graphitic material 21 or between polymer binder 23 and silicon oxide material 22. In Examples 1 to 7, polymer binder 23 contained a carboxy group.

In Examples 1 to 7, the weight average molecular weight (Mw) was not lower than 230,000 and not higher than 360,000 and as a result, cycle capacity retention tended to be improved.

The embodiments and examples disclosed herein are illustrative and non-restrictive in any respect. The technical scope indicated by the claims is intended to include any modifications within the scope and meaning equivalent to the terms of the claims.

What is claimed is:

1. A lithium-ion secondary battery comprising at least:
   a negative electrode;
   a positive electrode; and
   an electrolyte,
   the negative electrode comprising at least a negative electrode active material and a polymer binder,
   the negative electrode active material comprising at least a graphitic material and a silicon oxide material,
   the amount of acidic functional groups per unit surface area of the graphitic material being not lower than 0.017 mmol/m$^2$ and not higher than 0.086 mmol/m$^2$,
   the polymer binder comprising a carboxy group,
   the polymer binder comprising a main chain, the main chain having a length L not smaller than 0.53 μm and not greater than 2.13 μm,
   a ratio (L/D50) of the length L of the main chain to a particle size D50 in a volume-based particle size distribution of the graphitic material is not lower than 0.03 and not higher than 0.14.

2. The lithium-ion secondary battery according to claim 1, wherein the polymer binder is at least one selected from the group consisting of carboxymethylcellulose, metal salts of carboxymethylcellulose, polyacrylic acid, and metal salts of polyacrylic acid.

3. The lithium-ion secondary battery according to claim 1, wherein the polymer binder has a weight average molecular weight not lower than 230,000 and not higher than 360,000.

4. The lithium-ion secondary battery according to claim 1, wherein the particle size D50 of the graphitic material is not lower than 1 μm and not higher than 30 μm.

5. The lithium-ion secondary battery according to claim 1, wherein the particle size D50 of the graphitic material is not lower than 5 μm and not higher than 25 μm.

6. The lithium-ion secondary battery according to claim 1, wherein the particle size D50 of the graphitic material is not lower than 10 μm and not higher than 20 μm.

7. A method of producing a lithium-ion secondary battery, comprising at least:
   dissolving a polymer binder in water to prepare a polymer binder aqueous solution;
   dispersing a negative electrode active material in the polymer binder aqueous solution to prepare a negative-electrode-forming coating material;
   carrying out application of the negative-electrode-forming coating material and drying the negative-electrode-forming coating material to produce a negative electrode; and
   producing a lithium-ion secondary battery comprising at least the negative electrode, a positive electrode, and an electrolyte,
   the negative electrode active material comprising at least a graphitic material and a silicon oxide material,
   the amount of acidic functional groups per unit surface area of the graphitic material being not lower than 0.017 mmol/m$^2$ and not higher than 0.086 mmol/m$^2$,
   the polymer binder comprising a carboxy group,
   the polymer binder comprising a main chain, the main chain having a length not smaller than 0.53 μm and not greater than 2.13 μm,
   a ratio (L/D50) of the length L of the main chain to a particle size D50 in a volume-based particle size distribution of the graphitic material is not lower than 0.03 and not higher than 0.14.

8. The method according to claim 7, wherein the drying comprises heating the negative-electrode-forming coating material to a temperature not lower than 80° C. and not higher than 150° C.

9. The method according to claim 7, wherein, after the drying, the negative-electrode-forming coating material is heated to a temperature not lower than 80° C. and not higher than 150° C.

* * * * *